United States Patent
Jo et al.

(10) Patent No.: US 9,767,569 B2
(45) Date of Patent: Sep. 19, 2017

(54) MAGNETIC RESONANCE IMAGING APPARATUS AND MAGNETIC RESONANCE IMAGE PROCESSING METHOD

(71) Applicant: SAMSUNG ELECTRONICS CO., LTD., Suwon-si (KR)

(72) Inventors: Hyun-hee Jo, Osan-si (KR); Praveen Gulaka, Suwon-si (KR); Yang-lim Choi, Seongnam-si (KR); Se-Jin Yoo, Anseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 60 days.

(21) Appl. No.: 14/853,217

(22) Filed: Sep. 14, 2015

(65) Prior Publication Data
US 2016/0140726 A1    May 19, 2016

(30) Foreign Application Priority Data

Nov. 13, 2014   (KR) .................... 10-2014-0158058

(51) Int. Cl.
*G06T 7/00* (2017.01)
*G06T 7/11* (2017.01)
*G06T 7/174* (2017.01)

(52) U.S. Cl.
CPC .......... *G06T 7/0097* (2013.01); *G06T 7/0012* (2013.01); *G06T 7/11* (2017.01);
(Continued)

(58) Field of Classification Search
None
See application file for complete search history.

(56) References Cited

U.S. PATENT DOCUMENTS 5,544,653 A    8/1996  Takahashi et al.
5,926,568 A *  7/1999  Chaney .............. G06K 9/6206
                                                382/128

(Continued)

FOREIGN PATENT DOCUMENTS

EP    2762072 A1    8/2014
JP    3176652 B2    6/2001
(Continued)

OTHER PUBLICATIONS

Uokawa et al. "An Improved Computer Method to Prepare 3D Magnetic Resonance Images of Thoracic Structures," Journal of Digital Imaging, vol. 10, No. 2, May 1997.*

(Continued)

*Primary Examiner* — Matthew Bella
*Assistant Examiner* — Soo Shin
(74) *Attorney, Agent, or Firm* — Sughrue Mion, PLLC

(57) ABSTRACT

Disclosed are a method for processing a magnetic resonance (MR) image of a dynamic object and an MRI apparatus. The method includes receiving, from the dynamic object, a plurality of MR signals that correspond to a plurality of time sections and a plurality of slices, generating a plurality of MR images by using the plurality of MR signals, performing segmentation of each of the plurality of MR images into a plurality of regions, determining whether a segmentation error occurs in each of the plurality of MR images, and arranging the plurality of MR images to correspond to the respective time sections and the respective slices to display a matrix image, based on a result of the determining.

19 Claims, 14 Drawing Sheets

(52) U.S. Cl.
CPC .... *G06T 7/174* (2017.01); *G06T 2207/10088* (2013.01); *G06T 2207/20116* (2013.01)

(56) References Cited

U.S. PATENT DOCUMENTS

| | | | |
|---|---|---|---|
| 7,454,048 B2 | 11/2008 | Schoisswohl et al. | |
| 2004/0153128 A1* | 8/2004 | Suresh | G06F 19/3437 607/14 |
| 2005/0041842 A1* | 2/2005 | Frakes | G06K 9/3216 382/128 |
| 2006/0018548 A1 | 1/2006 | Chen et al. | |
| 2007/0014452 A1* | 1/2007 | Suresh | G06F 19/3437 382/128 |
| 2010/0215238 A1 | 8/2010 | Lu et al. | |
| 2010/0237863 A1 | 9/2010 | Stemmer | |
| 2010/0260396 A1 | 10/2010 | Brandt et al. | |
| 2010/0292561 A1* | 11/2010 | Greiser | G01R 33/50 600/410 |
| 2013/0033419 A1* | 2/2013 | Dror | G06T 7/0083 345/156 |
| 2013/0336553 A1* | 12/2013 | Buisseret | G06T 7/0083 382/128 |
| 2014/0341471 A1* | 11/2014 | Ono | A61B 5/055 382/173 |

FOREIGN PATENT DOCUMENTS

| | | |
|---|---|---|
| JP | 2013-66632 A | 4/2013 |
| KR | 10-1154355 B1 | 6/2012 |

OTHER PUBLICATIONS

Communication issued on Dec. 17, 2015 by the International Searching Authority in related Application No. PCT/KR2015/009441, (PCT/ISA/220. PCT/ISA/210, & PCT/ISA/237).

Communication issued on Jan. 28, 2016 by the Korean Intellectual Property Office in related Application No. 10-2014-0158058.

Communication dated May 23, 2016, issued by the Korean Intellectual Property Office in counterpart Korean Application No. 10-2014-0158058.

* cited by examiner

MAGNETIC RESONANCE IMAGING APPARATUS AND MAGNETIC RESONANCE IMAGE PROCESSING METHOD

CROSS-REFERENCE TO RELATED APPLICATION

This application claims priority from Korean Patent Application No. 10-2014-0158058, filed on Nov. 13, 2014, in the Korean Intellectual Property Office, the disclosure of which is incorporated herein by reference in its entirety.

BACKGROUND

1. Field

One or more exemplary embodiments relate to a magnetic resonance imaging (MRI) apparatus and a magnetic resonance (MR) image processing method.

2. Description of the Related Art

MRI apparatuses are apparatuses that photograph an object by using a magnetic field. MRI apparatuses three-dimensionally show lumbar discs, joints, nerve ligaments, and a heart in addition to bones, at a desired angle, and thus are being widely used for an accurate diagnosis of a disease. In a heart which beats with time, the presence of a disease of the heart is determined by acquiring and analyzing an MR image in units of a certain time.

A user (hereinafter referred to as an operator, a radiologist, or a manipulator) of an MRI apparatus manipulates the MRI apparatus to acquire an image. Since the user of the MRI apparatus repeatedly manipulates the MRI apparatus over a period of years, the convenient manipulation of the MRI apparatus is a very important issue.

SUMMARY

One or more exemplary embodiments include an MR image processing method and an apparatus for executing the same, which facilitate the more convenient manipulation of a user.

One or more exemplary embodiments include an MR image processing method and an apparatus for executing the same, which provides a user interface that enables a segmentation error to be easily determined.

Additional aspects will be set forth in part in the description which follows and, in part, will be apparent from the description, or may be learned by practice of the presented exemplary embodiments.

According to one or more exemplary embodiments, a method for processing a magnetic resonance (MR) image of a dynamic object includes: receiving, from the dynamic object, a plurality of MR signals that correspond to a plurality of time sections and to a plurality of slices; generating a plurality of MR images by using the plurality of MR signals; performing a segmentation of each of the plurality of MR images into a plurality of regions; determining whether a respective segmentation error occurs in each of the plurality of MR images; and arranging the plurality of MR images to correspond to the respective time sections and the respective slices to display a matrix image, based on a result of the determining.

The determining may include calculating, for each of the plurality of MR images, a respective segmentation error probability of the performed segmentation.

The determining may include calculating a segmentation error probability, based on a size of an image of the dynamic object in which each of the plurality of MR images is changed in correspondence with an order of the time sections and an order of the slices.

The displaying may include displaying the matrix image, based on the calculated segmentation error probability for each of the plurality of MR images.

The method may further include determining, from among the plurality of MR images, a first MR image for which the calculated segmentation error probability is equal to or greater than a predetermined reference value, determining, from among the plurality of MR images, a second MR image for which the calculated segmentation error probability is less than the predetermined reference value, and displaying the determined first MR image.

The displaying may include at least one from among changing a color of the matrix image based on the calculated segmentation error probability, changing a contrast of the matrix image based on the calculated segmentation error probability, and adding a predetermined mark to the matrix image in order to display the matrix image.

The method may further include determining whether to correct the matrix image, based on a result of the determining whether a segmentation error occurs.

The method may further include correcting the matrix image, based on a result of the determining whether to correct the matrix image.

The correcting may include correcting the matrix image with reference to a first MR image from among the plurality of MR images, wherein for the first MR image, a determination is made that abnormal segmentation does not occur.

The correcting may include correcting the matrix image based on a respective segmentation error probability of each of the plurality of MR images.

The displaying may include correcting and displaying the matrix image, based on a result of the determining.

According to one or more exemplary embodiments, a magnetic resonance imaging (MRI) apparatus for imaging a dynamic object includes: an image processor configured to receive, from the dynamic object, a plurality of MR signals that correspond to a plurality of time sections and to a plurality of slices, the received plurality of MR signals being usable to generate a plurality of MR images, the image processor being further configured to segment each of the plurality of MR images into a plurality of regions, and to arrange the plurality of MR images to correspond to the respective time sections and the respective slices in order to generate a matrix image; and a display configured to display the matrix image, wherein the image processor is further configured to determine whether a respective segmentation error occurs in each of the plurality of MR images, and to facilitate a display of the matrix image by the display based on a result of the determining.

The image processor may be further configured to calculate a respective segmentation error probability with respect to the segmentation.

The image processor may be further configured to calculate a segmentation error probability, based on a size of an image of the dynamic object in which each of the plurality of MR images is changed in correspondence with an order of the time sections and an order of the slices.

The display may be further configured to display the matrix image based on the calculated segmentation error probability for each of the plurality of MR images.

The image processor may be further configured to determine, from among the plurality of MR images, a first MR image for which the calculated segmentation error probability is equal to or greater than a predetermined reference value, and to determine, from among the plurality of MR images, a second MR image for which the calculated segmentation error probability is less than the predetermined reference value, and the display may be further configured to display the determined first MR image.

The image processor may include a corrector configured to determine whether to correct the matrix image, based on a result of the determining whether a segmentation occurs, and to correct the matrix image, based on a result of the determining whether to correct the matrix image.

The corrector may be further configured to correct the matrix image with reference to a first MR image from among the plurality of MR images, wherein for the first MR image, a determination is made that abnormal segmentation does not occur.

The corrector may be further configured to correct the matrix image, based on a respective segmentation error probability of each of the plurality of MR images.

The display may be further configured to correct and display the matrix image, based on a result of the determining.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1A:
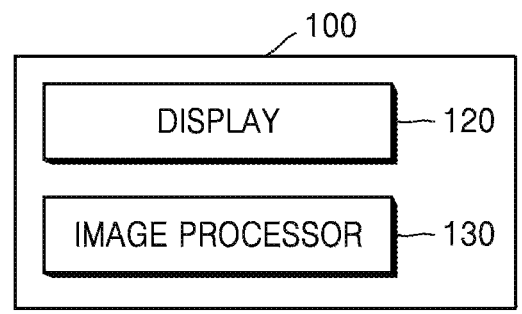
FIG. 1A is a diagram illustrating an MRI apparatus, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present disclosure.

The attached drawings for illustrating exemplary embodiments are referred to in order to gain a sufficient understanding of the present inventive concept, the merits thereof, and the objectives accomplished by the implementation of the exemplary embodiments. The present inventive concept may, however, be embodied in many different forms and should not be construed as being limited to the exemplary embodiments set forth herein; rather, these exemplary embodiments are provided such that this disclosure will be thorough and complete, and will fully convey the present inventive concept to one of ordinary skill in the art.

Hereinafter, the terms used in the specification will be briefly described, and then the exemplary embodiments will be described in detail.

The terms used in this specification are those general terms currently widely used in the art in consideration of functions regarding the exemplary embodiments, but the terms may vary according to the intention of those of ordinary skill in the art, precedents, or new technology in the art. Also, specified terms may be selected by the applicant, and in this case, the detailed meaning thereof will be described in the detailed description. Thus, the terms used in the specification should be understood not as simple names but based on the meaning of the terms and the overall description of the exemplary embodiments.

When a part "includes" or "comprises" an element, unless there is a particular description contrary thereto, the part can further include other elements, not excluding the other elements. Also, the term "unit" in the exemplary embodiments means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

Reference will now be made in detail to exemplary embodiments, examples of which are illustrated in the accompanying drawings. In the following description, well-known functions or constructions are not described in detail so as not to obscure the exemplary embodiments with unnecessary detail.

Throughout the specification, an "image" may denote multi-dimensional data composed of discrete image elements (for example, pixels in a two-dimensional image and voxels in a three-dimensional image). For example, an image may include medical images of an object acquired by any of an X-ray, a CT, an MRI, an ultrasound wave, and other medical image systems.

Furthermore, in the present specification, an "object" may be a human, an animal, or a part of a human or animal. For example, the object may be an organ (e.g., the liver, the heart, the womb, the brain, a breast, or the abdomen), a blood vessel, or a combination thereof. Furthermore, the "object" may be a phantom. The phantom means a material having a density, an effective atomic number, and a volume that are approximately the same as those of an organism. For example, the phantom may be a spherical phantom having properties similar to the human body.

Furthermore, in the present specification, a "user" may be, but is not limited to, a medical expert, such as a medical doctor, a nurse, a medical laboratory technologist, or a technician who repairs a medical apparatus.

Furthermore, in the present specification, an "MR image" refers to an image of an object obtained by using the nuclear magnetic resonance principle.

Furthermore, in the present specification, a "pulse sequence" refers to continuity of signals repeatedly applied by an MRI apparatus. Furthermore, in the present specification, a "pulse sequence" refers to continuity of signals repeatedly applied by an MRI apparatus.

Furthermore, in the present specification, a "pulse sequence schematic diagram" shows an order of events that occur in an MRI apparatus. For example, the pulse sequence schematic diagram may be a diagram showing any of an RF pulse, a gradient magnetic field, an MR signal, or the like according to time.

An MRI system is an apparatus that is configured for acquiring a sectional image of a part of an object by expressing, in a contrast comparison, a strength of a MR signal with respect to a radio frequency (RF) signal generated in a magnetic field having a specific strength. For example, if an RF signal that only resonates a specific atomic nucleus (for example, a hydrogen atomic nucleus) is emitted for an instant toward the object placed in a strong magnetic field and then such emission stops, an MR signal is emitted from the specific atomic nucleus. The MRI system may receive the MR signal and then use the received MR signal to acquire an MR image. The MR signal denotes an RF signal emitted from the object. An intensity of the MR signal may be determined according to a density of a predetermined atom (for example, hydrogen) of the object, a relaxation time T1, a relaxation time T2, and a flow of blood or the like.

MRI systems include characteristics which are different from those of other imaging apparatuses. Unlike imaging apparatuses such as CT apparatuses that acquire images according to a direction of detection hardware, MRI systems may acquire two-dimensional (2D) images or three-dimensional (3D) volume images that are oriented toward an optional point. MRI systems do not expose objects or examiners to radiation, unlike CT apparatuses, X-ray apparatuses, position emission tomography (PET) apparatuses, and single photon emission CT (SPECT) apparatuses, may acquire images having high soft tissue contrast, and may acquire neurological images, intravascular images, musculoskeletal images, and oncologic images that are required to precisely capturing abnormal tissues.

FIG. 1A is a diagram illustrating an MRI apparatus 100, according to an exemplary embodiment.

The MRI apparatus 100 may include a display 120 and an image processor 130.

The image processor 130 may process an MR signal received from an object in order to generate MR data relating to the object.

The image processor 130 may receive the MR signal received by a radio frequency (RF) receiver and perform various signal processing, such as any of amplification, frequency conversion, phase detection, low-frequency amplification, and filtering, on the received MR signal.

The image processor 130 may arrange digital data in a k space (for example, also referred to as a Fourier space or a frequency space) of a memory, and rearrange the digital data into image data via 2D or 3D Fourier transformation.

The image processor 130 may perform a composition process and/or difference calculation process upon the image data. The composition process may include an addition process with respect to a pixel and/or a maximum intensity projection (MIP) process. The image processor 130 may store not only the rearranged image data, but also image data upon which a composition process or a difference calculation process is performed, in a memory or an external server.

The image processor 130 may perform any of the signal processes on the MR signal in parallel. For example, the image processor 62 may perform a signal process upon a plurality of MR signals received by a multi-channel RF coil in parallel so as to rearrange the plurality of MR signals into image data.

In a case where the MRI apparatus 100 generates an MR image of an object that moves, such as, for example, a heart, the image processor 130 may generate a plurality of MR images by using an MR signal, received from a dynamic object, that corresponds to a plurality of time sections and to a plurality of slices. Further, the image processor 130 may distinguish the MR images so as to correspond to the respective time sections and the respective slices, thereby generating a plurality of unit MR images (also referred to herein as "elemental MR images" and/or as "MR images"). Further, the image processor 130 may segment an object into a plurality of regions in each of the unit MR images. For example, the image processor 130 may divide a left ventricle into an inner wall and an outer wall of a myocardium in each of the unit MR images.

The image processor 130 according to an exemplary embodiment may determine whether each of the unit MR images is accurately segmented, and when there is an error, the image processor 130 may transfer display data, corresponding to the error, to the display 120.

The display 120 may display, to a user, an MR image generated by the image processor and/or an MR image reconstructed by the image processor 130. Further, the display 120 may display a graphic user interface (GUI) and display information, which is necessary for the user to manipulate an MRI system, such as user information or object information. The display 120 may include any of a cathode ray tube (CRT) display, a liquid crystal display (LCD), a plasma display panel (PDP), an organic light emitting diode (OLED) display, a field emission display (FED), a light emitting diode (LED) display, a vacuum fluorescent display (VFD), a digital light processing (DLP) display, a flat panel display, a three-dimensional (3D) display, and/or a transparent display.

The display 120 according to an exemplary embodiment may display a mark corresponding to an error according to a result of a determination made by the image processor 130. For example, the image processor 130 may determine whether the inner wall and outer wall of the myocardium are accurately divided in the segmented MR image, and the display 120 may display the mark corresponding to the error according to a result of the determination. For example, the display 120 may mark a particular shape and/or a particular color on a portion of a unit MR image in correspondence with the error.

Figure 1B:
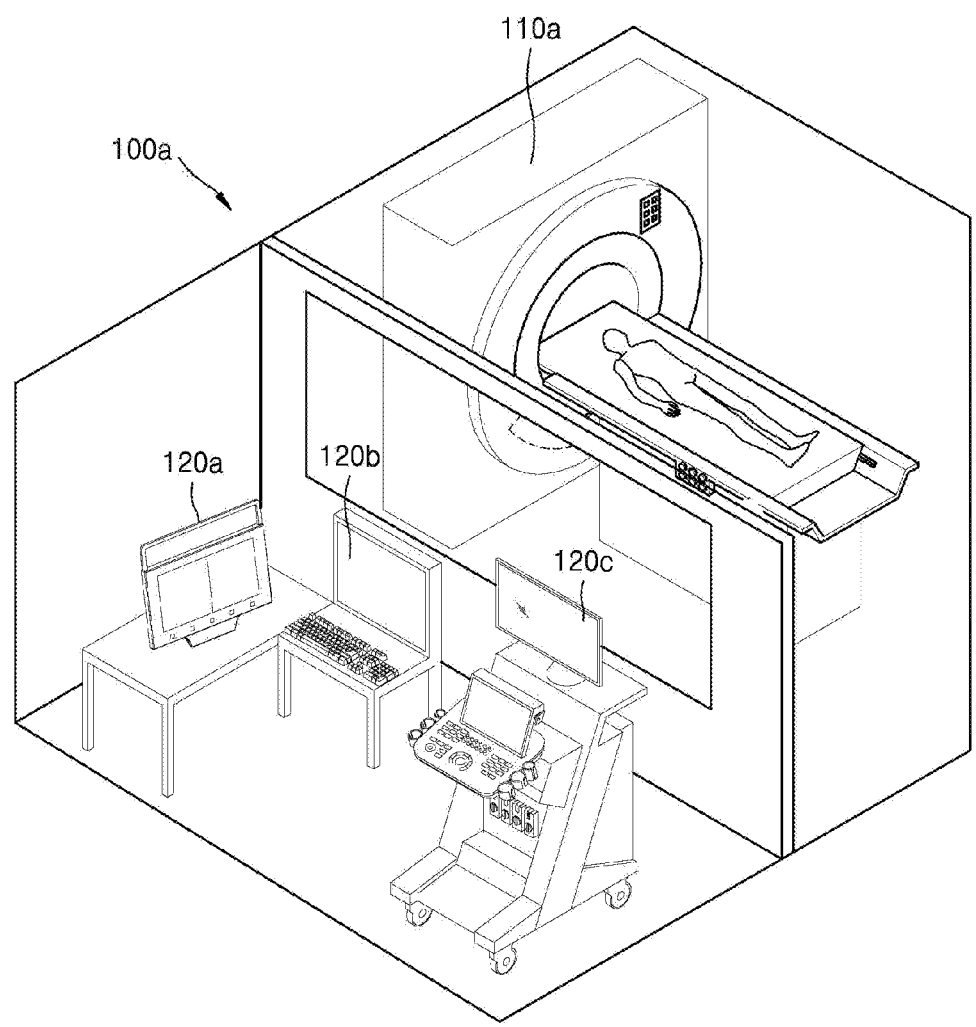
FIG. 1B is a diagram illustrating an MRI apparatus, according to an exemplary embodiment.

FIG. 1B is a diagram illustrating an MRI apparatus 100a, according to an exemplary embodiment.

The MRI apparatus 100a may include a measurement unit (also referred to herein as a "measurement device" and/or as a "measurement") 110a and a plurality of displays 120a, 120b, and 120c.

The measurement unit 110a may apply an MR signal to an object so as to generate an image of the object, and receive the MR signal from the object. The measurement unit 110a may include a gantry including a main magnet, a gradient coil, and an RF coil. For example, the measurement unit 110a may include the image processor 130 of FIG. 1A.

Each of the displays 120a, 120b, and 120c may receive an MR image generated by the measurement unit 110a and display the MR image via any of various GUIs.

Figure 2:
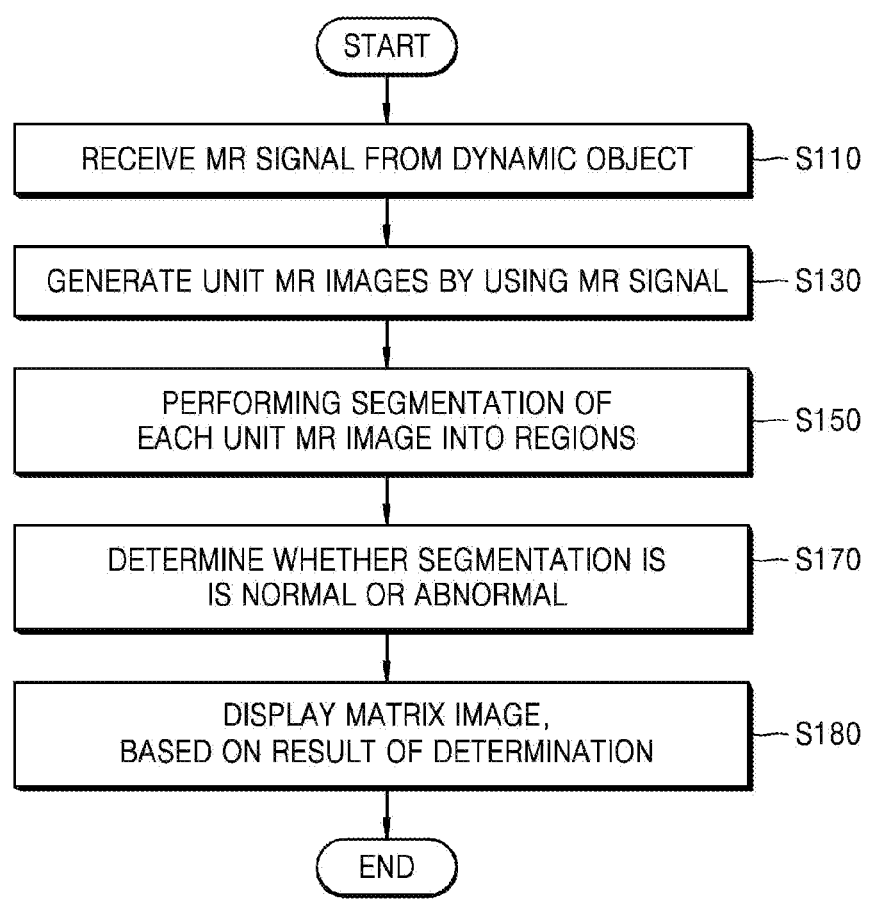
FIG. 2 is a flowchart for describing an MR image processing method, according to an exemplary embodiment.

FIG. 2 is a flowchart for describing an MR image processing method, according to an exemplary embodiment.

In operation S110, the image processor 130 may receive, from a dynamic object, a plurality of MR signals that correspond to a plurality of time sections and to a plurality of slices. The image processor 130 may receive apply an RF signal to the dynamic object in order to receive an MR signal. In operation S130, the image processor 130 may generate a plurality of MR images by using the MR signals. The image processor 130 may receive the MR signals so as to correspond to the respective slices and the respective time sections, and generate a plurality of unit MR images respectively corresponding to the received MR signals by using the MR signals.

In operation S150, the image processor 130 may segment each of the generated MR images into a plurality of regions. The image processor 130 may segment the unit MR images by using any of various algorithms. For example, the image processor 130 may segment an inner wall and an outer wall of a myocardium in a left ventricle image included in the unit MR images.

In operation S170, the image processor 130 may determine, for each of the unit MR images, whether the segmentation is normal or abnormal. The image processor 130 may determine whether the segmentation of the unit MR image is normal or abnormal, by using any of various algorithms.

For example, the image processor 130 may determine whether the segmentation is normal or abnormal, based on whether sizes of the inner wall and outer wall of the myocardium are changed in the left ventricle image, and in a time order and a slice order. For example, when the size of the inner wall of the myocardium is equal to a first value in a first time section and the size of the inner wall of the myocardium is equal to a third value in a third time section, the image processor 130 may determine whether the size of the inner wall of the myocardium should be equal to a second value between the first value and the third value in a second time section between the first time section and the third time section, thereby determining whether the segmentation is normal or abnormal.

In operation S180, the display 120 may arrange the unit MR images so as to correspond to the respective time sections and the respective slices, based on a result of the determination, thereby displaying a matrix image. The display 120 may display a matrix image which is as illustrated in FIG. 3B.

Figure 3A:
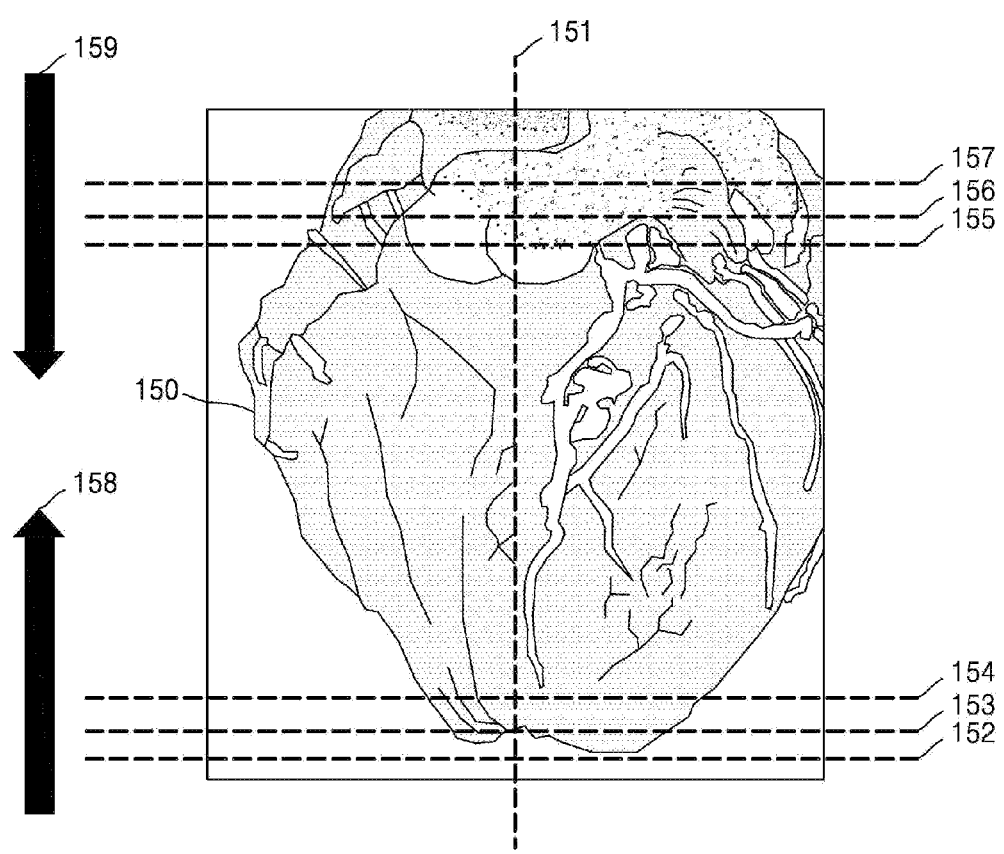
FIGS. 3A and 3B are diagrams for describing in detail a display of FIG. 1A, according to an exemplary embodiment.
Figure 3B:
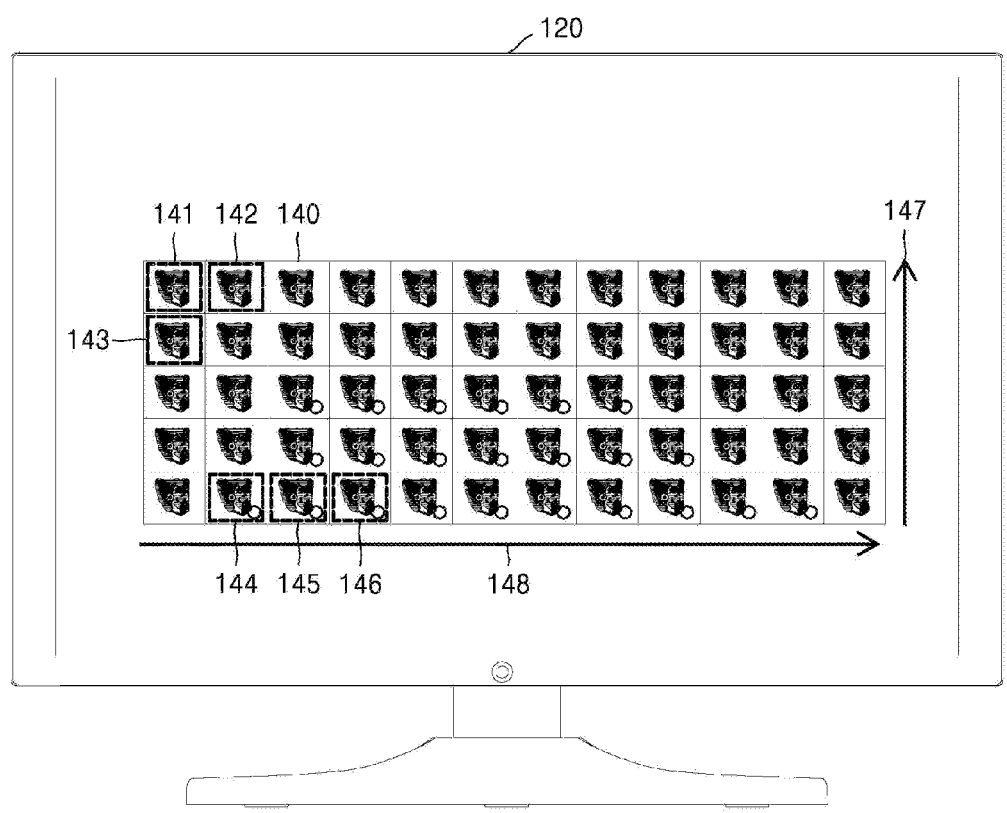

FIGS. 3A and 3B are diagrams for describing in detail the display 120 of FIG. 1A, according to an exemplary embodiment.

Referring to FIGS. 1 and 3A, the MRI apparatus 100 MRI-photographs a heart 150 (i.e., an object to be photographed) in order to generate an MR image.

In order to check the presence of a heart disease, a point that has an abnormality may be found and diagnosed by acquiring and analyzing MR images about any of several axes (for example, a short axis or a long axis) of a heart. Acquiring a short-axis MR image of the heart among a plurality of heart MR images is very important for an analysis of a heart disease.

The MRI apparatus 100 may MRI-photograph the heart along a short axis of the heart in order to acquire a short-axis MR image for a plurality of time sections and a plurality of slices. Referring also to FIG. 3B, the image processor 130 of the MRI apparatus 100 may arrange the short-axis MR image for the plurality of time sections and the plurality of slices in a time order and a slice order in order to generate a matrix image 140.

As illustrated in FIG. 3A, the image processor 130 may generate short-axis MR images 141, 142, 143, 144, 145, and 146 corresponding to short axes 152, 153, 154, 155, 156, and 157 representing a surface vertical to a long axis 151 in a heart. Further, referring also to FIG. 3B, the display 120 may display the matrix image 140, which is generated by arranging the generated short-axis MR images according to positions of slices corresponding thereto. In this case, an arrangement order may become a first direction 158 or a second direction 159, which correspond to first direction 147 and second direction 148 as illustrated in FIG. 3B.

Figure 4:
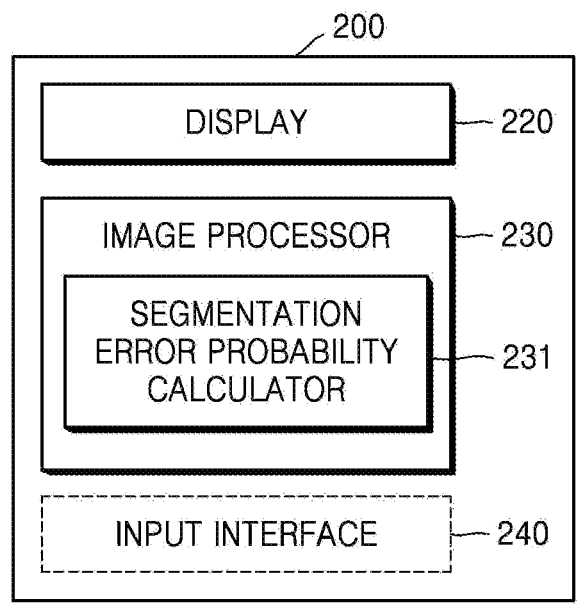
FIG. 4 is a diagram illustrating an MRI apparatus, according to another exemplary embodiment.

FIG. 4 is a diagram illustrating an MRI apparatus 200, according to another exemplary embodiment.

The MRI apparatus 200 may include a display 220, an image processor 230, and an input interface 240.

The image processor 230 may include a segmentation error probability calculator 231.

The image processor 130 may process an MR signal received from an object to generate MR data that relates to the object.

In a case where the MRI apparatus 200 generates an MR image of an object that moves, such as, for example, a heart, the image processor 230 may generate a plurality of MR images by using an MR signal, received from a dynamic object, for a plurality of time sections, and arrange the MR images so as to correspond to the respective time sections, thereby generating a matrix image.

The image processor 230 may determine whether each of unit MR images is accurately segmented, and when there is an error, the image processor 230 may transfer display data, corresponding to the error, to the display 220.

The image processor 230 according to an exemplary embodiment may include the segmentation error probability calculator 231.

The segmentation error probability calculator 231 may calculate a segmentation error probability for each of a plurality of unit MR images, based on a length, a width, a shape, and a type of an image object included in an image.

For example, the segmentation error probability calculator 231 may measure a length of a particular portion of each unit MR image in the order of time sections, and calculate a segmentation error probability by using the measured length of the particular portion.

The display 220 may display, to a user, an MR image generated by the image processor 230 and/or an MR image reconstructed by the image processor 230. Further, the display 220 may display a GUI.

The display 220 may display a mark corresponding to an error according to a result of determination by the image processor 230. For example, the display 220 may display a mark corresponding to an error, based on a determination result in which the image processor 230 determines that a segmented MR image is abnormally segmented.

The input interface 240 may receive a user input from the user via any of various ways.

For example, the input interface 240 may denote a means for facilitating an input of data by a user for controlling the MRI apparatus 200. For example, the input interface 240 may include any one or more of a keypad, a dome switch, a touch pad (for example, a contact capacitive type, a press resistive type, an infrared sensing type, a surface ultrasound conductive type, an integration tension measurement type, and a piezo effect type), a jog wheel, and/or a jog switch. Further, the input interface 240 may include any one or more of a touch screen, a touch panel, a microphone, and/or a keyboard.

Moreover, the input interface 240 may include at least one or more modules that are configured to receive data from the user. For example, the input interface 240 may include any of a motion recognition module, a touch recognition module, and/or a voice recognition module.

The touch recognition module may be configured to sense a touch gesture of a user applied to a touch screen and to transfer information relating to the touch gesture to a processor. The voice recognition module may be configured to recognize a voice of a user by using a voice recognition engine and to transfer the recognized voice to the processor. The motion recognition module may be configured to recognize a motion of an object which is an input means, and to transfer, to the processor, information relating to the motion of the object which is the input means.

In the present specification, an input which is received from a user via the input interface 240 of the MRI apparatus 200 may include at least one selected from a touch input, a bending input, a voice input, a key input, and a multimodal input.

Figure 5:
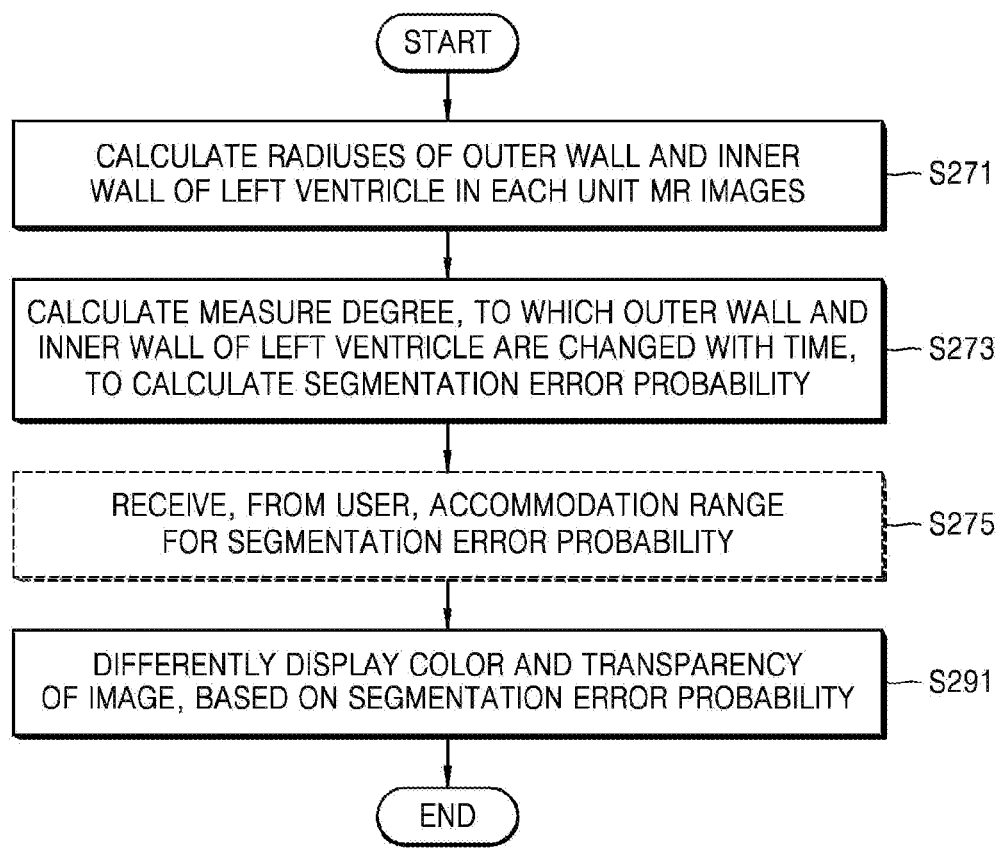
FIG. 5 is a flowchart for describing in detail an operation of a segmentation error probability calculator of FIG. 4, according to an exemplary embodiment.
Figure 6:
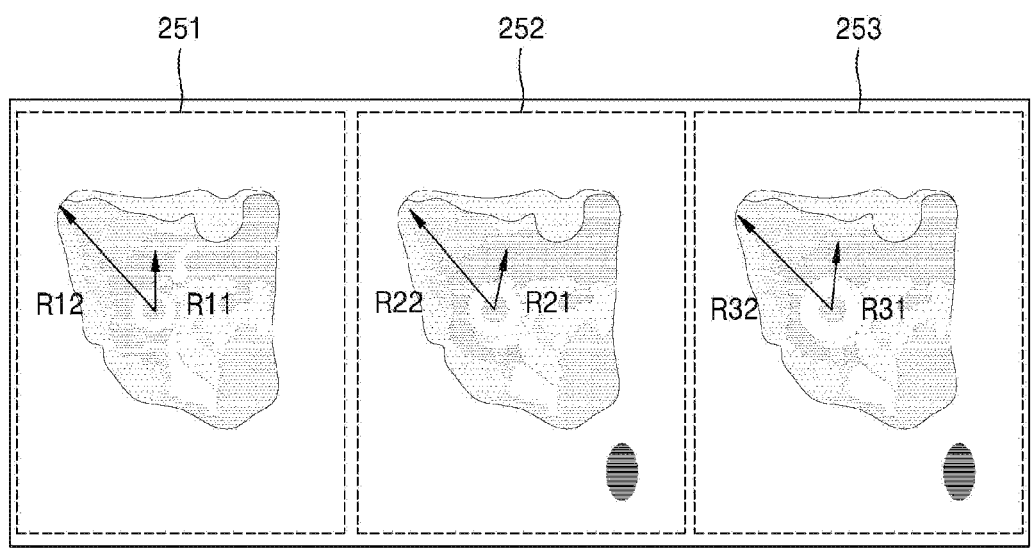
FIG. 6 is a flowchart for describing in detail the operation of the segmentation error probability calculator of FIG. 4, according to an exemplary embodiment.

FIG. 5 is a flowchart for describing in detail an operation of the segmentation error probability calculator 231 of FIG. 4, according to an exemplary embodiment. FIG. 6 is a flowchart for describing in detail the operation of the segmentation error probability calculator 231 of FIG. 4, according to an exemplary embodiment.

Referring to FIGS. 5 and 6, in operation S271, the segmentation error probability calculator 231 may calculate radiuses R12, R22 and R32 of an outer wall of a left ventricle and radiuses R11, R21 and R31 of an inner wall of the left ventricle in a plurality of unit MR images 251, 252, and 253.

The segmentation error probability calculator 231 may calculate the radiuses R12, R22 and R32 of the outer wall of the left ventricle and the radiuses R11, R21 and R31 of the inner wall of the left ventricle by applying any of various image processing schemes.

In operation S273, the segmentation error probability calculator 231 may calculate a degree to which the outer wall and the inner wall of the left ventricle are changed with time, in order to calculate a segmentation error probability.

For example, when the radiuses R12, R22 and R32 of the outer wall of the left ventricle increase or decrease as a function of time, the segmentation error probability calculator 231 may calculate a segmentation error probability of a unit MR image 252 by using a difference value between a ratio of the radius R12 to the radius R22 and a ratio of the radius R22 to the radius R32.

For example, when the radiuses R11, R21 and R31 of the inner wall of the left ventricle increase or decrease as a function of time, the segmentation error probability calculator 231 may calculate a segmentation error probability of the unit MR image 252 by using a ratio of the radius R11 to the radius R31, a ratio of the radius R21 to the radius R31, and a ratio of the radius R11 to the radius R21.

In operation S275, the segmentation error probability calculator 231 may receive, from a user, an accommodation range for the calculated segmentation error probability.

The segmentation error probability calculator 231 may receive, from the user, the accommodation range for the segmentation error probability via any of various ways. For example, the segmentation error probability calculator 231 may receive the accommodation range for the segmentation error probability via the input interface 240.

The segmentation error probability calculator 231 may receive the accommodation range as a grade of the segmentation error probability via the input interface 240. For example, if the segmentation error probability is classified into five grades (for example, five ranges [0; 0.2]; [0.2; 0.4]; [0.4; 0.6]; [0.6; 0.8]; and [0.8; 1]), the input interface 240 may receive the accommodation range as a first grade and a second grade from the user. The segmentation error probability calculator 231 may determine that a unit MR image (for example, MR image 251) corresponding to the first grade and the second grade is normally segmented, and determine that a segmentation error occurs in a unit MR image (for example, MR image 252 and MR image 253) corresponding to third, fourth, and fifth grades.

In operation S291, the display 220 may variably display a color and a transparency of an image, based on a segmentation error probability.

For example, the display 220 may variably display a transparency of a unit MR image according to a grade to which the segmentation error probability corresponds. For example, if the segmentation error probability is classified into five grades (for example, five ranges corresponding to intervals defined by [0; 0.2; 0.4; 0.6; 0.8; 1]), the display 220 may display a unit MR image that corresponds to a first grade (for example, a [0; 0.2] range), at a transparency of about 10%, and display a unit MR image that corresponds to a fifth grade (for example, a [0.8; 1] range), at a transparency of about 90%.

For example, the display 220 may variably display a color of a unit MR image according to a grade to which the segmentation error probability corresponds. For example, if the segmentation error probability is classified into ten grades (for example, ten ranges corresponding to intervals defined by [0; 0.1; 0.2; 0.3; 0.4; 0.5; 0.6; 0.7; 0.8; 0.9; 1]), the display 220 may display a unit MR image that corresponds to a second grade (for example, a [0.1; 0.2] range), in red, and display a unit MR image that corresponds to a ninth grade (for example, a [0.8; 0.9] range), in green.

According to another exemplary embodiment, the display 220 may variably display a brightness of an image, based on a segmentation error probability. Further, the display 220 may variably display a mark, based on a segmentation error probability.

Figure 7:
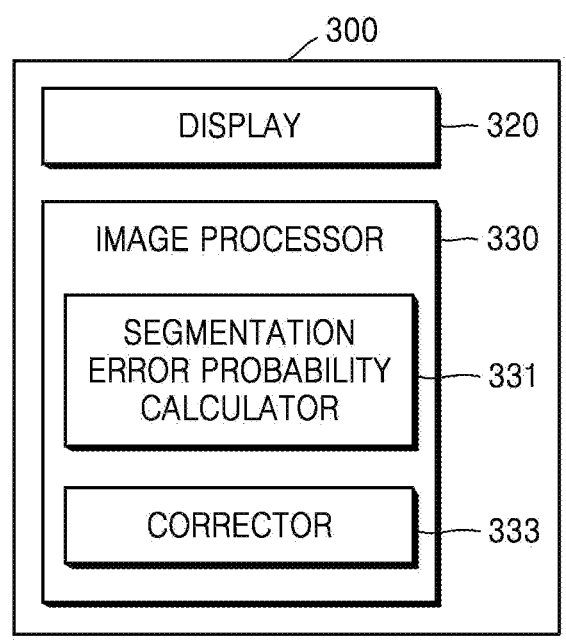
FIG. 7 is a diagram illustrating an MRI apparatus, according to another exemplary embodiment.

FIG. 7 is a diagram illustrating an MRI apparatus 300, according to another exemplary embodiment.

The MRI apparatus 300 may include a display 320 and an image processor 330. The image processor 330 may include a segmentation error probability calculator 331 and a corrector 333.

The image processor 330 may process an MR signal received from an object in order to generate MR data relating to the object.

In a case where the MRI apparatus 300 generates an MR image of an object that moves, such as, for example, a heart, the image processor 330 may generate a plurality of MR images by using an MR signal, received from a dynamic object, for a plurality of time sections, and arrange the MR images so as to correspond to the respective time sections, thereby generating a matrix image.

The image processor 330 may determine whether each of unit MR images is accurately segmented, and when there is an error, the image processor 330 may transfer display data, corresponding to the error, to the display 320.

The image processor 330 according to an exemplary embodiment may include the segmentation error probability calculator 331.

The segmentation error probability calculator 231 may calculate a segmentation error probability for each of a plurality of unit MR images, based on a length, a width, a shape, and a type of an image object included in an image.

For example, the segmentation error probability calculator 331 may measure a length of a particular portion of each unit MR image in the order of time sections, and calculate a segmentation error probability by using the measured length of the particular portion.

The display 320 may display, to a user, an MR image generated by the image processor 330 and/or an MR image reconstructed by the image processor 330. Further, the display 320 may display a GUI.

The display 320 may display a mark corresponding to an error according to a result of determination by the image processor 330. For example, the display 320 may display a mark corresponding to an error, based on a determination result in which the image processor 330 determines that segmented MR images are arranged in the order of time.

Figure 8:
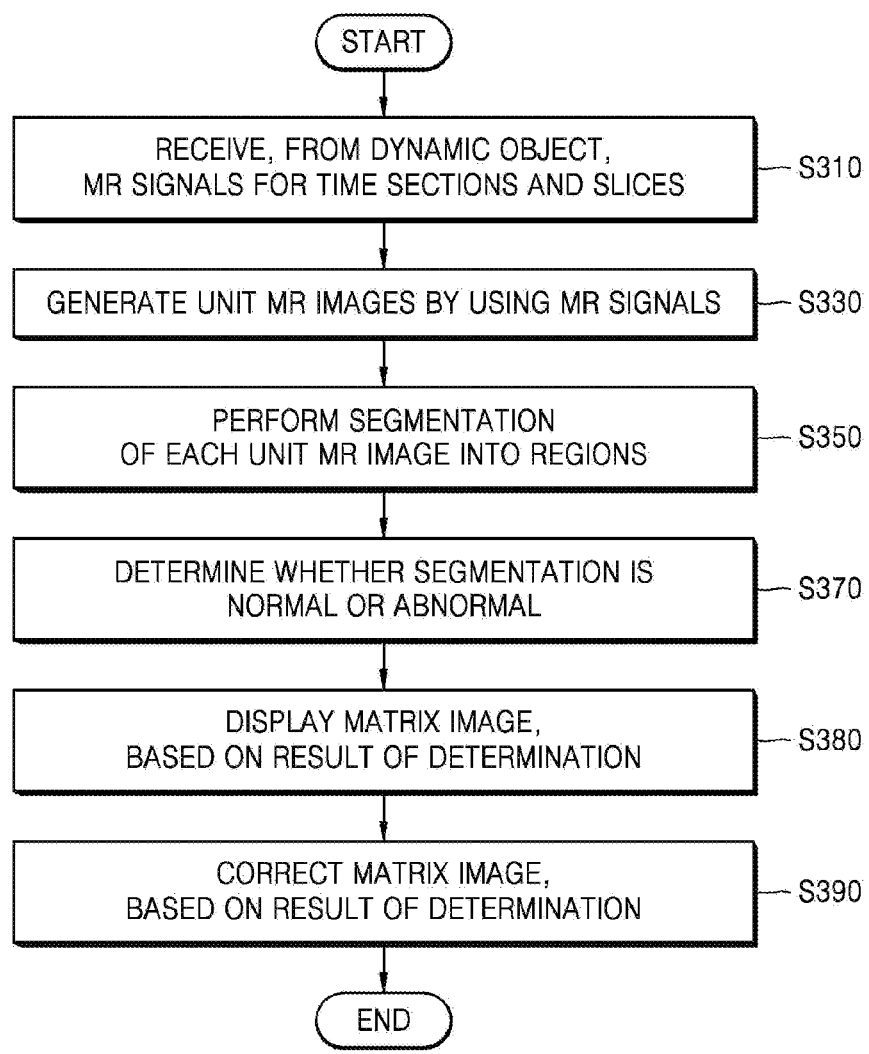
FIG. 8 is a flowchart for describing an MR image processing method, according to an exemplary embodiment.

FIG. 8 is a flowchart for describing an MR image processing method, according to an exemplary embodiment.

In operation S310, the image processor 330 may receive, from a dynamic object, a plurality of MR signals that correspond to a plurality of time sections and to a plurality of slices. The image processor 330 may receive apply an RF signal to the dynamic object in order to receive an MR signal.

In operation S330, the image processor 330 may generate a plurality of MR images by using the MR signals. The image processor 330 may receive the MR signals so as to correspond to the respective slices and the respective time sections, and generate a plurality of unit MR images respectively corresponding to the received MR signals by using the MR signals.

In operation S350, the image processor 330 may segment each of the unit MR images into a plurality of regions. The image processor 330 may arrange the generated unit MR images so as to correspond to the respective time sections and the respective slices, thereby generating a matrix image.

In operation S370, the image processor 330 may determine whether each unit MR image is accurately segmented.

In operation S380, the display 320 may display the matrix image, based on a result of the determination. The display 120 may display a matrix image, similarly as illustrated in FIG. 3B.

In operation S390, the corrector 333 according to an exemplary embodiment may correct the matrix image, based on the determination result. The corrector 333 may receive a user input that relates to correcting the matrix image, or the corrector 333 may correct the matrix image by using a predetermined algorithm. The corrector 333 may re-segment and correct the unit MR images included in the matrix image. The corrector 333 may correct an image included in each of the unit MR images included in the matrix image. The corrector 333 may provide a plurality of candidate images to a user and correct the matrix image by using a candidate image selected by the user.

Figure 9:
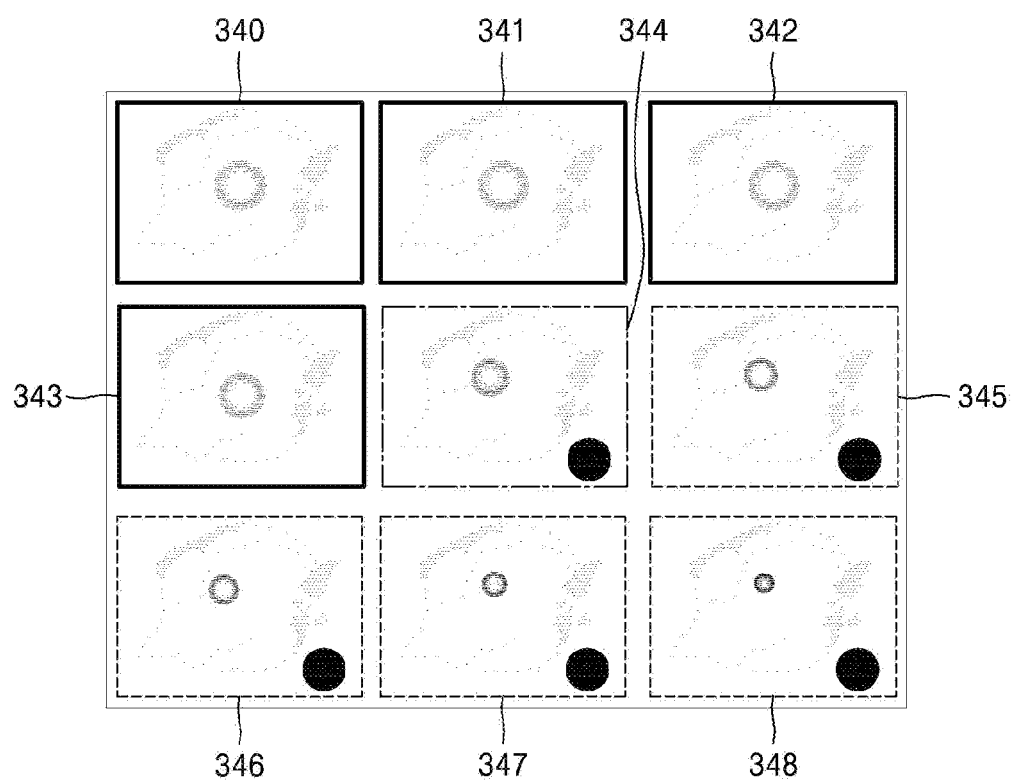
FIGS. 9 and 10 are diagrams for describing in detail a correction of an MR image, according to an exemplary embodiment.
Figure 10:
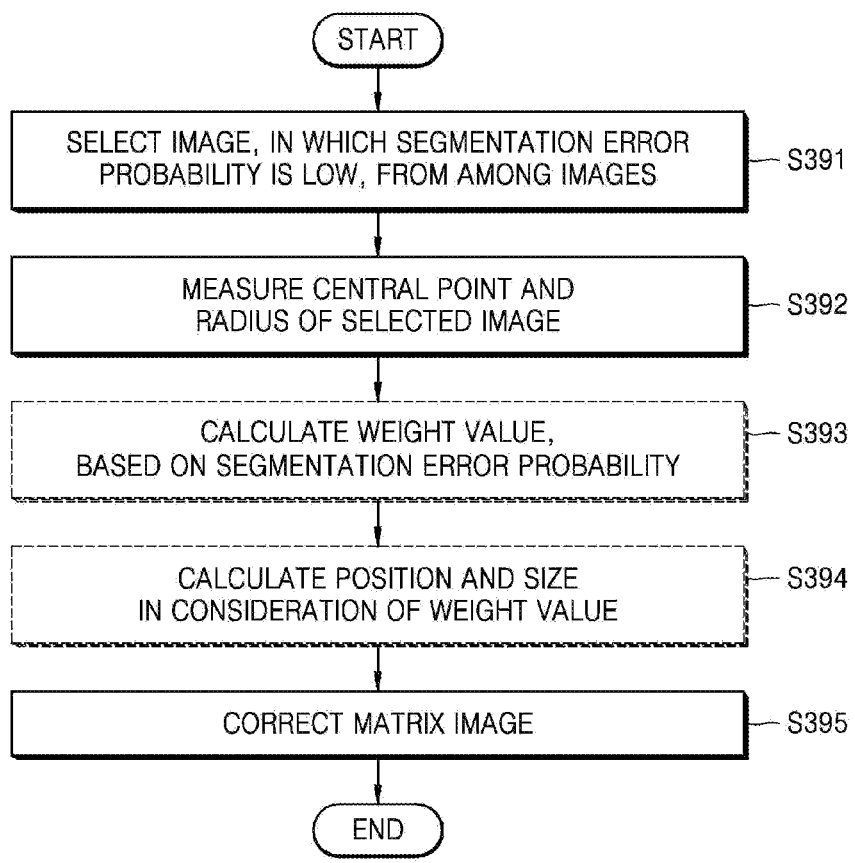

FIGS. 9 and 10 are diagrams for describing in detail a correction of an MR image, according to an exemplary embodiment.

Referring to FIG. 9, the segmentation error probability calculator 331 may calculate radiuses of an outer wall and an inner wall of a left ventricle by applying any of various image processing schemes. For example, the segmentation error probability calculator 331 may calculate a degree to which the outer wall and the inner wall of the left ventricle are changed as a function of time, in order to calculate a segmentation error probability.

In regard to a plurality of unit MR images (for example, 340, 341, 342, 343, 344, 345, 346, 347, and 348), when the respective segmentation error probability calculated by the segmentation error probability calculator 331 is equal to or greater than a reference value, the image processor 330 may determine that a segmentation error occurs in a corresponding unit MR image.

In regard to the unit MR images (for example, 340, 341, 342, 343, 344, 345, 346, 347, and 348), when the respective segmentation error probability calculated by the segmentation error probability calculator 331 is less than the reference value, the image processor 330 may determine a corresponding unit MR image as being normally segmented.

The corrector 333 may not use data that relates to a plurality of unit MR images (for example, 344, 345, 346, 347, and 348) in which a segmentation error is determined by the image processor 330, for correcting another unit MR image.

For example, the corrector 333 may not use data relating to a plurality of unit MR images (for example, 344, 345, 346, 347, and 348) in which a segmentation error is determined, for correcting an image included in a unit MR image 344.

The corrector 333 may use data that relates to a plurality of unit MR images (for example, 340, 341, 342, and 343) in which normal segmentation is determined by the image processor 330, for correcting another unit MR image.

For example, the corrector 333 may not use data relating to a plurality of unit MR images (for example, 340, 341, 342, and 343) in which normal segmentation is determined, for correcting an image included in the unit MR image 344.

Referring to FIGS. 9 and 10, in operation S391, the corrector 333 may select an image in which a segmentation error probability is low, from among a plurality of images adjacent to a unit MR image which is to be corrected. For example, the corrector 333 may select a unit MR image (for example, 340, 341, 342, and/or 343) in which the segmentation error probability is less than a reference value. For example, the corrector 333 may select a unit MR image (for example, 340, 341, 342, and/or 343) in which normal segmentation is determined.

In operation S392, the corrector 333 may measure a central point and a radius of the selected image. The corrector 333 may determine a central point of an image included in the selected unit MR image (for example, 340, 341, 342, and/or 343) and calculate an average distance from the central point to an outer portion. For example, the corrector 333 may determine a size of an image included in the unit MR image 344, which is to be corrected, by using the calculated average distance.

In a similar method, the corrector 333 may determine a position of the image included in the unit MR image 344 which is to be corrected, with reference to the image included in the selected unit MR image (for example, 340, 341, 342, and 343).

In operation S393, the corrector 333 may calculate a weight value, based on the segmentation error probability. In a case of determining a size or a position of the image included in the unit MR image 344 which is to be corrected, the corrector 333 may consider a segmentation error probability of a unit MR image (for example, 340, 341, 342, and/or 343) which is used as a reference. The corrector 333 may determine a weight value of each unit MR image (for example, 340, 341, 342, and 343) by using the segmentation error probability of the unit MR image (for example, 340, 341, 342, and/or 343) which is used as the reference.

In operation S394, the corrector 333 may calculate a position and a size of an image in consideration of the determined weight value. For example, the corrector 333 may determine a radius to an inner wall or an outer wall of a myocardium included in the unit MR image 344 by multiplying the weight value and a size of an image included in the unit MR image (for example, 340, 341, 342, and 343) which is used as the reference.

The corrector 333 may determine a position of an image included in the unit MR image 344 by multiplying the weight value and the size of the image included in the unit MR image (for example, 340, 341, 342, and 343) which is used as the reference.

In operation S395, the corrector 333 may correct a matrix image. The corrector 333 may correct the matrix image by using the determined size or position of the image.

Figure 11:
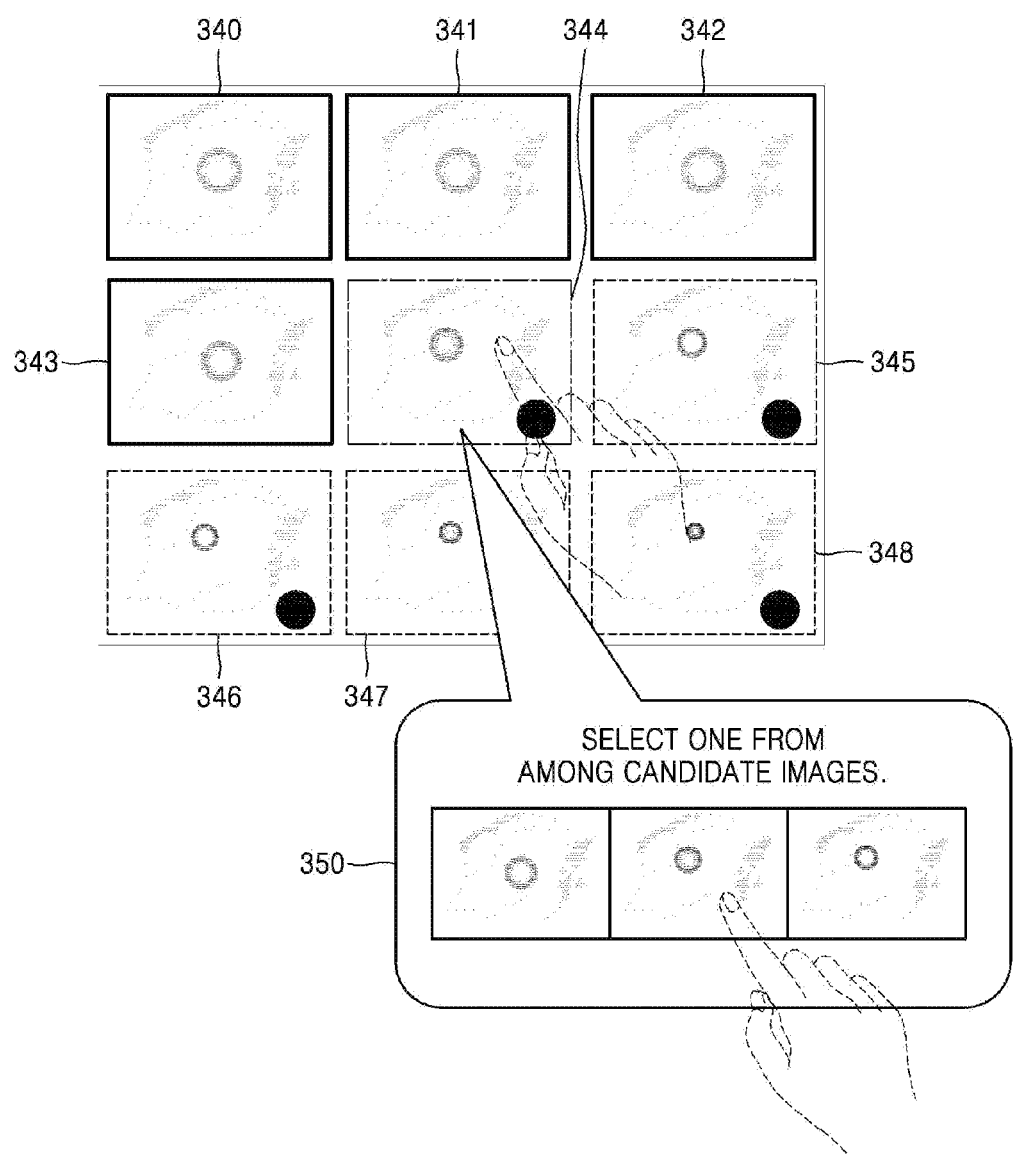
FIG. 11 is a diagram for describing in detail a correction of an MR image, according to another exemplary embodiment.

FIG. 11 is a diagram for describing in detail a correction of an MR image, according to another exemplary embodiment.

Referring to FIG. 11, the display 320 may display, to a user, a candidate image for correction. For example, the display 320 may be configured with a touch screen and receive a touch input from the user. When the user touches, via an input interface (not shown), the unit MR image 344 which is to be corrected, the display 320 may provide a candidate image to the user via a GUI 350. The display 320 may receive a selection input from the user to correct the unit MR image 344.

The image processor 330 may generate a candidate image by using any of various algorithms. For example, the image processor 330 may generate a first candidate image by executing a correction with no consideration of a weight value, and generate a second candidate image by executing a correction with the consideration of the weight value. For example, the image processor 330 may generate the first candidate image by executing a correction with the consideration of a corrected image and generate the second candidate image by executing a correction with the consideration of an uncorrected image.

Figure 12:
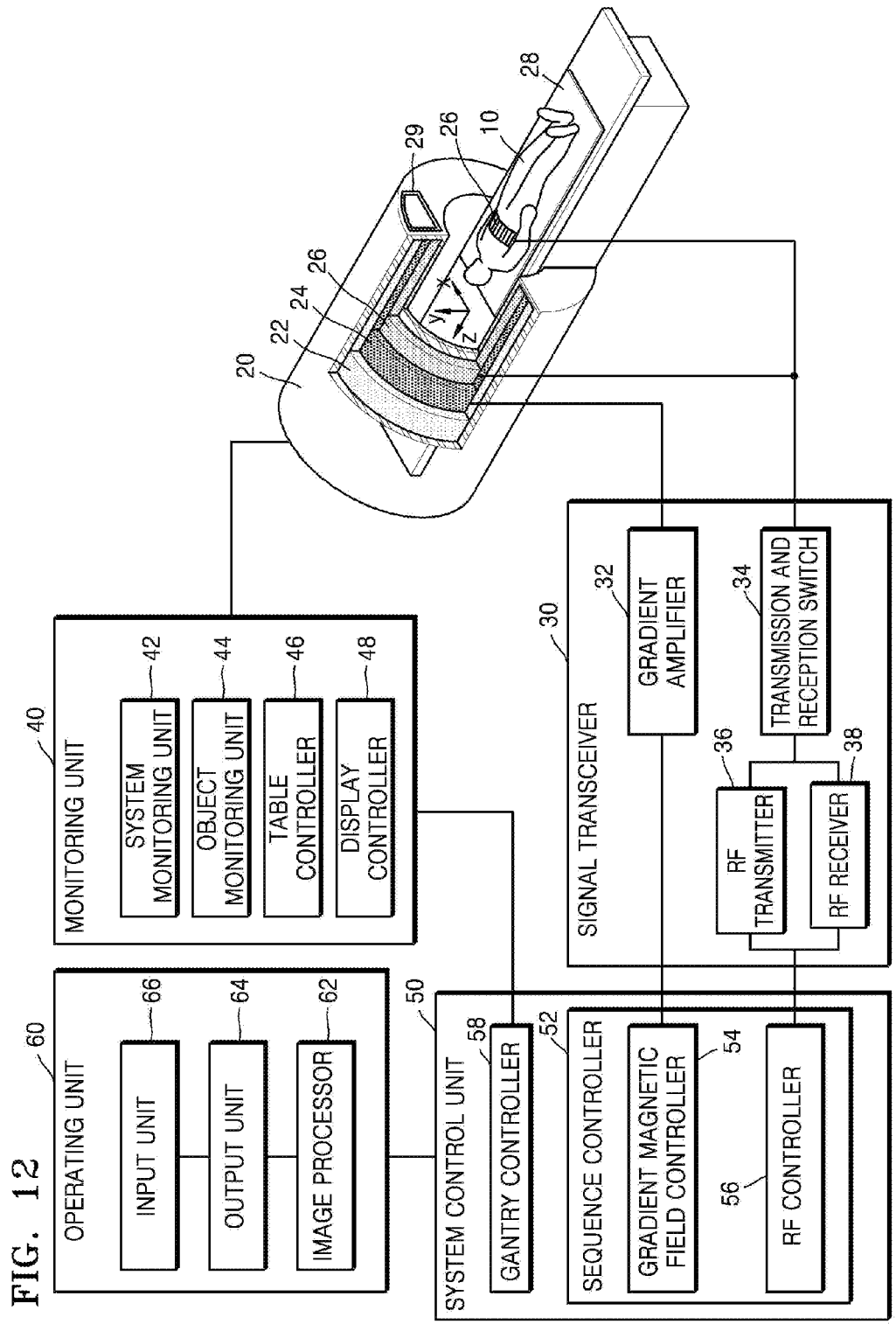
FIG. 12 is a block diagram of a general MRI system.

FIG. 12 is a block diagram of a general MRI system. Referring to FIG. 12, the general MRI system may include a gantry 20, a signal transceiver 30, a monitoring unit (also referred to herein as a "monitor") 40, a system control unit (also referred to herein as a "system controller") 50, and an operating unit (also referred to herein as a "system operator" and/or as an "operator") 60.

The gantry 20 prevents external emission of electromagnetic waves generated by a main magnet 22, a gradient coil 24, and an RF coil 26. A magnetostatic field and a gradient magnetic field are formed in a bore in the gantry 20, and an RF signal is emitted toward an object 10.

The main magnet 22, the gradient coil 24, and the RF coil 26 may be arranged in a predetermined direction of the gantry 20. The predetermined direction may be a coaxial cylinder direction, i.e., a direction that coincides with a central axis of a cylinder that corresponds to the gantry 20. The object 10 may be disposed on a table 28 that is capable of being inserted into a cylinder along a horizontal axis of the cylinder.

The main magnet 22 generates a magnetostatic field or a static magnetic field for aligning magnetic dipole moments of atomic nuclei of the object 10 in a constant direction. A precise and accurate MR image of the object 10 may be obtained due to a magnetic field generated by the main magnet 22 being strong and uniform.

The gradient coil 24 includes X, Y, and Z coils for generating gradient magnetic fields in X-axis, Y-axis, and Z-axis directions which cross each other at right angles (i.e., are mutually orthogonal). The gradient coil 24 may provide location information of each region of the object 10 by variably inducing resonance frequencies according to the regions of the object 10.

The RF coil 26 may emit an RF signal toward a patient and receive an MR signal emitted from the patient. In detail, the RF coil 26 may transmit, toward atomic nuclei included in the patient and having precessional motion, an RF signal having the same frequency as that of the precessional motion, cease the transmission of the RF signal, and then receive an MR signal emitted from the atomic nuclei included in the patient.

For example, in order to cause an atomic nucleus to transition from a low energy state to a high energy state, the RF coil 26 may generate and apply an electromagnetic wave signal that is an RF signal corresponding to a type of the atomic nucleus, to the object 10. When the electromagnetic wave signal generated by the RF coil 26 is applied to the atomic nucleus, the atomic nucleus may transit from the low energy state to the high energy state. Then, when electromagnetic waves generated by the RF coil 26 disappear, the atomic nucleus to which the electromagnetic waves were applied transits from the high energy state to the low energy state, thereby emitting electromagnetic waves having a Larmor frequency. In this aspect, when the applying of the electromagnetic wave signal to the atomic nucleus is ceased, an energy level of the atomic nucleus is changed from a high energy level to a low energy level, and thus the atomic nucleus may emit electromagnetic waves having a Larmor frequency. The RF coil 26 may receive electromagnetic wave signals from atomic nuclei included in the object 10.

The RF coil 26 may be realized as one RF transmitting and receiving coil having both a function of generating electromagnetic waves, each having an RF that corresponds to a type of an atomic nucleus, and a function of receiving electromagnetic waves emitted from an atomic nucleus. Alternatively, the RF coil 26 may be realized as two coils, i.e., a transmission RF coil having a function of generating electromagnetic waves, each having an RF that corresponds to a type of an atomic nucleus, and a reception RF coil having a function of receiving electromagnetic waves emitted from an atomic nucleus.

The RF coil 26 may be fixed to the gantry 20 or may be detachable. When the RF coil 26 is detachable, the RF coil 26 may be an RF coil that corresponds to a specific part of the object, such as a head RF coil, a chest RF coil, a leg RF coil, a neck RF coil, a shoulder RF coil, a wrist RF coil, or an ankle RF coil.

The RF coil 26 may communicate with an external apparatus via wires and/or wirelessly, and may also perform dual tune communication according to a communication frequency band.

The RF coil 26 may communicate with an external apparatus via wires and/or wirelessly, and may also perform dual tune communication according to a communication frequency band.

The RF coil 26 may include any of a transmission exclusive coil, a reception exclusive coil, or a transmission and reception coil, according to methods of transmitting and receiving an RF signal.

The RF coil 26 may include an RF coil that has any of various numbers of channels, such as 16 channels, 32 channels, 72 channels, and 144 channels.

The gantry 20 may further include a display 29 disposed outside the gantry 20 and a display (not shown) disposed inside the gantry 20. The gantry 20 may provide predetermined information to the user or the object 10 via the display 29 and the display respectively disposed outside and inside the gantry 20.

The signal transceiver 30 may control the gradient magnetic field formed inside the gantry 20, i.e., in the bore, according to a predetermined MR sequence, and control transmission and reception of an RF signal and an MR signal.

The signal transceiver 30 may include a gradient amplifier 32, a transmission and reception switch 34, an RF transmitter 36, and an RF receiver 38.

The gradient amplifier 32 drives the gradient coil 24 included in the gantry 20, and may supply a pulse signal for generating a gradient magnetic field to the gradient coil 24 under the control of a gradient magnetic field controller 54. By controlling the pulse signal supplied from the gradient amplifier 32 to the gradient coil 24, gradient magnetic fields in X-axis, Y-axis, and Z-axis directions may be synthesized.

The RF transmitter 36 and the RF receiver 38 may drive the RF coil 26. The RF transmitter 36 may supply an RF pulse in a Larmor frequency to the RF coil 26, and the RF receiver 38 may receive an MR signal received by the RF coil 26.

The transmission and reception switch 34 may adjust transmitting and receiving directions of the RF signal and the MR signal. For example, the transmission and reception switch 34 may emit the RF signal toward the object 10 via the RF coil 26 during a transmission mode, and receive the MR signal from the object 10 via the RF coil 26 during a reception mode. The transmission and reception switch 34 may be controlled by a control signal output by an RF controller 56.

The monitoring unit 40 may monitor or control the gantry 20 and/or devices mounted on the gantry 20. The monitoring unit 40 may include a system monitoring unit (also referred to herein as a "system monitor") 42, an object monitoring (also referred to as an "object monitor") unit 44, a table controller 46, and a display controller 48.

The system monitoring unit 42 may monitor and control any one or more of a state of the magnetostatic field, a state of the gradient magnetic field, a state of the RF signal, a state of the RF coil 26, a state of the table 28, a state of a device measuring body information of the object 10, a power supply state, a state of a thermal exchanger, and a state of a compressor.

The object monitoring unit 44 monitors a state of the object 10. In detail, the object monitoring unit 44 may include any one or more of a camera for observing a movement or position of the object 10, a respiration measurer for measuring the respiration of the object 10, an electrocardiogram (ECG) measurer for measuring the electrical activity of the object 10, and/or a temperature measurer for measuring a temperature of the object 10.

The table controller 46 controls a movement of the table 28 where the object 10 is positioned. The table controller 46 may control the movement of the table 28 according to a sequence control of a sequence controller 52. For example, during moving imaging of the object 10, the table controller 46 may continuously or discontinuously move the table 28 according to the sequence control of the sequence controller 52, and thus the object 10 may be photographed in a field of view (FOV) which is larger than that of the gantry 20.

The display controller 48 controls the display 29 disposed outside the gantry 20 and the display disposed inside the gantry 20. In detail, the display controller 48 may control the display 29 and the display to be powered on or powered off, and may control a screen image to be output on the display 29 and the display. Further, when a speaker is located inside or outside the gantry 20, the display controller 48 may control the speaker to be powered on or powered off, and/or may control sound to be output via the speaker.

The system control unit 50 may include the sequence controller 52 for controlling a sequence of signals formed in the gantry 20, and a gantry controller 58 for controlling the gantry 20 and the devices mounted on the gantry 20.

The sequence controller 52 may include the gradient magnetic field controller 54 for controlling the gradient amplifier 32, and the RF controller 56 for controlling the RF transmitter 36, the RF receiver 38, and the transmission and reception switch 34. The sequence controller 52 may control the gradient amplifier 32, the RF transmitter 36, the RF receiver 38, and the transmission and reception switch 34 according to a pulse sequence received from the operating unit 60. In particular, the pulse sequence includes all information required to control the gradient amplifier 32, the RF transmitter 36, the RF receiver 38, and the transmission and reception switch 34. For example, the pulse sequence may include information that relates to any one or more of a strength, an application time, and application timing of a pulse signal applied to the gradient coil 24.

The operating unit 60 may request the system control unit 50 to transmit pulse sequence information while controlling an overall operation of the MRI system.

The operating unit 60 may include an image processor 62 for receiving and processing the MR signal received by the RF receiver 38, an output unit (also referred to herein as an "output device") 64, and an input unit (also referred to herein as an "input device") 66.

The image processor 62 may include any of the image processor 130 of FIG. 1, the image processor 230 of FIG. 4, and the image processor 330 of FIG. 7.

The image processor 62 may process the MR signal received from the RF receiver 38 so as to generate MR image data that relates to the object 10.

The image processor 62 receives the MR signal received by the RF receiver 38 and performs any one or more of various signal processes, such as amplification, frequency transformation, phase detection, low frequency amplification, and filtering, with respect to the received MR signal.

The image processor 62 may arrange digital data in a k space (for example, also referred to as a Fourier space or a frequency space) of a memory, and rearrange the digital data into image data via 2D or 3D Fourier transformation.

If needed, the image processor 62 may perform a composition process and/or a difference calculation process with respect to the image data. The composition process may include an addition process with respect to a pixel and/or a maximum intensity projection (MIP) process. The image processor 62 may store not only the rearranged image data, but also image data upon which a composition process or a difference calculation process is performed, in a memory (not shown) or an external server.

The image processor 62 may perform any of the signal processes on the MR signal in parallel. For example, the image processor 62 may perform a signal process with respect to a plurality of MR signals received by a multichannel RF coil in parallel so as to rearrange the plurality of MR signals into image data.

The output unit 64 may include any of the display 120 of FIG. 1, the display 220 of FIG. 4, and the display 320 of FIG. 1.

The output unit 64 may output image data generated or rearranged by the image processor 62 to the user. The output unit 64 may also output information required for the user to manipulate the MRI system, such as information relating to a user interface (UI), user information, or object information. The output unit 64 may include any one or more of a speaker, a printer, a cathode-ray tube (CRT) display, a liquid crystal display (LCD), a plasma display panel (PDP), an organic light-emitting device (OLED) display, a field emission display (FED), a light-emitting diode (LED) display, a vacuum fluorescent display (VFD), a digital light processing (DLP) display, a flat panel display (FPD), a 3-dimensional (3D) display, a transparent display, and/or any one of other various output devices that are well known to one of ordinary skill in the art.

The user may input any of object information, parameter information, a scan condition, a pulse sequence, and/or information relating to image composition or difference calculation by using the input unit 66. The input unit 66 may include any of a keyboard, a mouse, a track ball, a voice recognizer, a gesture recognizer, a touch screen, and/or any one of other various input devices that are well known to one of ordinary skill in the art.

The signal transceiver 30, the monitoring unit 40, the system control unit 50, and the operating unit 60 are separate components in FIG. 12, but it will be apparent to one of ordinary skill in the art that respective functions of the signal transceiver 30, the monitoring unit 40, the system control unit 50, and the operating unit 60 may be performed by another component. For example, the image processor 62 converts the MR signal received from the RF receiver 38 into a digital signal in FIG. 1, but alternatively, the conversion of the MR signal into the digital signal may be performed by the RF receiver 38 or the RF coil 26.

The gantry 20, the RF coil 26, the signal transceiver 30, the monitoring unit 40, the system control unit 50, and the operating unit 60 may be connected to each other by wire or wirelessly, and when they are connected wirelessly, the MRI system may further include an apparatus (not shown) for synchronizing clock signals therebetween. Communication between the gantry 20, the RF coil 26, the signal transceiver 30, the monitoring unit 40, the system control unit 50, and the operating unit 60 may be performed by using a high-speed digital interface, such as low voltage differential signaling (LVDS), asynchronous serial communication, such as a universal asynchronous receiver transmitter (UART), a low-delay network protocol, such as error synchronous serial communication or a controller area network (CAN), optical communication, or any of other various communication methods that are well known to one of ordinary skill in the art.

The exemplary embodiments may be written as computer programs and may be implemented in general-use digital computers that execute the programs using a transitory or non-transitory computer-readable recording medium.

Examples of the computer-readable recording medium include magnetic storage media (e.g., ROM, floppy disks, hard disks, etc.), optical recording media (e.g., CD-ROMs, or DVDs), etc.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of processing a magnetic resonance (MR) image of a dynamic object, the method comprising:
receiving, from the dynamic object, a plurality of MR signals corresponding to a plurality of time sections and to a plurality of slices;
generating a plurality of MR images, based on the plurality of MR signals;
performing a segmentation of each of the plurality of MR images into a plurality of regions;
determining whether a segmentation error of the segmentation occurs in each of the plurality of MR images, by calculating, for each of the plurality of MR images, a segmentation error probability, based on a difference between a size of the dynamic object in a respective one of the plurality of MR images and a size of the dynamic object in a respective previous one of the plurality of the MR images; and
displaying a matrix image comprising the plurality of MR images that is arranged to respectively correspond to the plurality of time sections and the plurality of slices, a color and a transparency of each of the plurality of MR images being variably displayed to indicate a result of the determining of whether the segmentation error occurs in a respective one of the plurality of MR images.

2. The method of claim 1, wherein the determining comprises calculating, for each of the plurality of MR images, the segmentation error probability with respect to the performed segmentation.

3. The method of claim 2, wherein the displaying comprises displaying the matrix image, based on the calculated segmentation error probability for each of the plurality of MR images.

4. The method of claim 3, wherein the determining comprises:
determining that the segmentation error occurs in a first MR image for which the calculated segmentation error probability is greater than or equal to a predetermined reference value, among the plurality of MR images; and
determining that the segmentation error does not occur in a second MR image for which the calculated segmentation error probability is less than the predetermined reference value, among the plurality of MR images, and
wherein the displaying further comprises displaying the first MR image, based on the determining that the segmentation error occurs in the first MR image.

5. The method of claim 3, wherein the displaying comprises any one or any combination of changing a color of the matrix image, based on the calculated segmentation error probability for each of the plurality of MR images, changing a contrast of the matrix image, based on the calculated segmentation error probability for each of the plurality of MR images, and adding a predetermined mark to the matrix image.

6. The method of claim 1, further comprising determining whether to correct the matrix image, based on a result of the determining of whether the segmentation error occurs.

7. The method of claim 6, further comprising correcting the matrix image, based on a result of the determining of whether to correct the matrix image.

8. The method of claim 7, wherein the determining comprises determining that the segmentation error does not occur in a first MR image among the plurality of MR images, and the correcting comprises correcting the matrix image with reference to the first MR image in which the segmentation error is determined to not occur.

9. The method of claim 7, wherein the correcting further comprises correcting the matrix image, based on the segmentation error probability of each of the plurality of MR images.

10. The method of claim 1, wherein the displaying comprises correcting and displaying the matrix image, based on a result of the determining.

11. A non-transitory computer-readable storage medium storing a program for executing the method of claim 1.

12. A magnetic resonance imaging (MRI) apparatus for imaging a dynamic object, the MRI apparatus comprising:

an image processor configured to:
receive, from the dynamic object, a plurality of MR signals corresponding to a plurality of time sections and to a plurality of slices;
generate a plurality of MR images, based on the plurality of MR signals;
segment each of the plurality of MR images into a plurality of regions; and
determine whether a segmentation error of the segmenting occurs in each of the plurality of MR images, by calculating, for each of the plurality of MR images, a segmentation error probability, based on a difference between a size of the dynamic object in a respective one of the plurality of MR images and a size of the dynamic object in a respective previous one of the plurality of the MR images; and a display,
wherein the image processor is further configured to control the display to display a matrix image comprising the plurality of MR images that is arranged to respectively correspond to the plurality of time sections and the plurality of slices, a color and a transparency of each of the plurality of MR images being variably displayed to indicate a result of the determining of whether the segmentation error occurs in a respective one of the plurality of MR images.

13. The MRI apparatus of claim 12, wherein the image processor is further configured to calculate the segmentation error probability with respect to the segmenting.

14. The MRI apparatus of claim 13, wherein the display is further configured to display the matrix image, based on the calculated segmentation error probability for each of the plurality of MR images.

15. The MRI apparatus of claim 13, wherein the image processor is further configured to:

determine that the segmentation error occurs in a first MR image for which the calculated segmentation error probability is greater than or equal to a predetermined reference value, among the plurality of MR images;

determine that the segmentation error does not occur in a second MR image for which the calculated segmentation error probability is less than the predetermined reference value, among the plurality of MR images; and control the display to display the first MR image, based on the determining that the segmentation error occurs in the first MR image.

16. The MRI apparatus of claim 12, wherein the image processor comprises a corrector configured to:

determine whether to correct the matrix image, based on a result of the determining of whether the segmentation error occurs; and correct the matrix image, based on a result of the determining of whether to correct the matrix image.

17. The MRI apparatus of claim 16, wherein the image processor is further configured to determine that the segmentation error does not occur in a first MR image among the plurality of MR images, and the corrector is further configured to correct the matrix image with reference to the first MR image in which the segmentation error is determined to not occur.

18. The MRI apparatus of claim 17, wherein the corrector is further configured to correct the matrix image, based on a segmentation error probability of each of the plurality of MR images.

19. The MRI apparatus of claim 12, wherein the display is further configured to correct and display the matrix image, based on a result of the determining.

* * * * *